(No Model.)

R. W. PECK.
SHAFT BEARING.

No. 265,338. Patented Oct. 3, 1882.

Witnesses:
Charles C. Stetson
Wm C. Dey

Inventor:
Richard W. Peck
by his attorney
T. A. Stetson

UNITED STATES PATENT OFFICE.

RICHARD W. PECK, OF BROOKLYN, NEW YORK.

SHAFT-BEARING.

SPECIFICATION forming part of Letters Patent No. 265,338, dated October 3, 1882.

Application filed March 9, 1882. (No model.)

*To all whom it may concern:*

Be it known that I, RICHARD W. PECK, of Brooklyn, in the county of Kings, in the State of New York, have invented certain new and useful Improvements in Shaft-Bearings, of which the following is a specification.

The invention is intended more particularly for the bearings of the shafts of propellers; but it may be used with advantage in many other situations. Its object is to secure efficient lubrication with a small amount of oil or grease, to avoid the dropping of oil from the bearings, and to facilitate cleansing the bearings by a liberal use of water applied by a hose.

It has long been common to make the bearings of screw-propellers and other large shafts larger than the other portions of such shafts. It is found to make no appreciable addition to the friction, and to afford great advantages by increasing the strength where it is likely to break, and especially by allowing liberally for smoothing in case the surfaces at these important portions become abraded from any cause.

I make my bearing with the shaft enlarged; but instead of, as usual, making the enlargement long, I make it short—a little shorter than the brasses or boxes in which each is inclosed—taking care, as usual, to avoid re-entering angles by gradually rounding the lines of junction; and I make the brasses with an internal lip on each end, extending inward to touch or nearly touch the small part of the shaft just beyond the termination of the enlargement. I cope or plane two small channels longitudinally along the inner face of the lower brass, so that any oil coming down from above, which may be supplied through an oil-cup in the usual way, first gathers in such longitudinal channels and fills them, and then rises in a little pool within the lip at each end, just outside of the enlargement. Any excess tending to accumulate at one end flows through the channels and appears in equal depth at the other end of the bearing, while the entire length of the bearing is effectually bathed in oil at each revolution by being equally and fully presented thereto in the act of passing the said channels.

The following is a description of what I consider the best means of carrying out the invention.

The accompanying drawings form a part of this specification.

Figure 1:
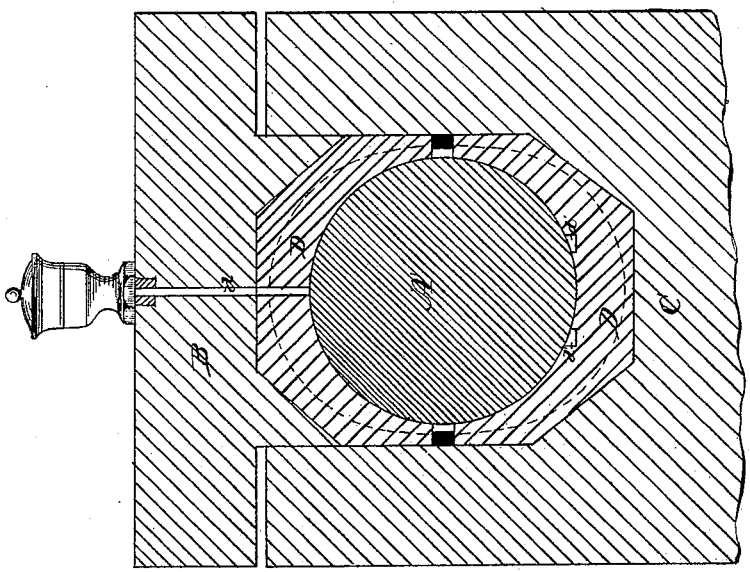
Figure 2:
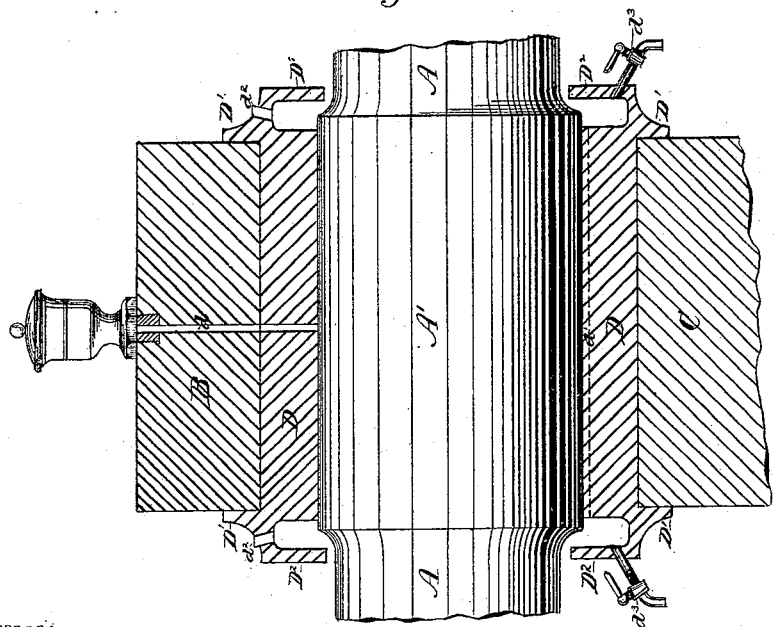

Figure 1 is a vertical section in the plane of the axis of the shaft, and Fig. 2 is a section at right angles thereto.

Similar letters of reference indicate like parts in all the figures.

A is the shaft, and A' the enlargement at the bearing. B is the pillow-block; C, the binder, held down by the usual bolts, (not shown;) and D D are the brasses, certain portions of the latter being designated by additional marks, as D' D², when necessary. The brasses are formed with the usual flanges, D', to match to the outer faces of the block B and binder C. Each end of each brass is provided with an internal lip, D². The enlargement A' of the shaft is made so short that the lips D² lie outside of the enlargement at each end, respectively. The lips are extended inward quite to the small portion A of the shaft. A longitudinal groove, d', is cut in the lower brass, extending from one end to the other of the bearing; but care is taken in planing or otherwise producing this channel d' not to cut or otherwise offset the lips D². The ordinary oil-hole, d, supplies oil from an oil-cup, applied in any suitable manner at the top. As the shaft revolves its motion receives oil on its surface and spreads it over the entire bearing, with a tendency to accumulate by gravity on its lower side. So soon as any thus accumulates it appears in the groove d' and flows freely along therein, forming a little reservoir or pool of oil within the lip D² at each end, from which oil will flow back into the channel d' to keep it supplied, if the flow down through the oil-hole d should for a time be suspended. The continued revolution of the shaft wets every portion of the bearing in the oil in the channel d' at each revolution. When liberally supplied through d it adds to the oil in d'; when scantily supplied the bearing, tending to become dry, takes up the oil from d'. Thus the channel d' serves usefully, and the lips D² serve in connection therewith by preventing the oil running away from the ends, and also forming oil-reservoirs there. The swell A' is important, as otherwise it would not be practicable to have the lips D², except by grooving the shaft, which would be very objectionable. I have described the swell as shorter than the brasses, which it in fact is; but the swell may be of any desired length by correspondingly increasing the length of the brasses. The brasses may be continued out at each end of their full thickness, if desired; but I prefer to contract the thickness, taking care to give sufficient for the small amount of strength required at these points. The drawings show the preferable form. The holes $d^2$ in the upper brass serve an important function by allowing a hose (not represented) to be introduced, and by a strong jet of water to thoroughly clean the deep circular cup, which is formed in the overhanging ends of the brasses. The water is allowed to flow continuously quite around the shaft. The small spaces between the boxes are filled with strips of soft wood; but care is taken to so cut them that there may be a clear flow up and down. The cocks $d^3$ allow the fluid in the cups or spaces thus provided to be discharged. The cups are large enough to accumulate considerable sediment without injury to the bearing. At intervals the oil is drawn out through $d^3$, water vigorously introduced through $d^2$, and drained out through $d^3$. Then the cocks $d^3$ are closed again and oil supplied. The holes $d^2$ are closed with any suitable plugs to exclude dust. I have applied these bearings on the main shaft of the new steamship Puebla, recently started on the Alexander line between New York, Havana, and Vera Cruz.

Parts of the invention may be used without the whole; but I prefer the whole used together about as shown. I can dispense with the provisions for washing and draining. I can dispense with one or both of the channels $d'$. When only one is used it is well to place it about where one of these lies, as it is less likely to weaken the brass than when at the extreme bottom.

I claim as my invention—

1. The brasses D, having internal lips, $D^2$, in combination with a shaft having an enlargement, $A'$, and arranged to serve as herein specified.

2. The brasses D, having internal lips, $D^2$, and the longitudinal channels $d'$ in the inner surface of the lower brass, in combination with each other and with the pillow-block B, binder C, and shaft $A\ A'$, as and for the purposes herein specified.

3. The brasses D, having internal lips, $D^2$, and the holes $d^3$ and drain-cocks $d^4$, in combination with a shaft, $A\ A'$, swelled, as shown, and arranged to serve as herein specified.

In testimony whereof I have hereunto set my hand, at New York city, New York, this 2d day of March, 1882, in the presence of two subscribing witnesses.

RICHARD W. PECK.

Witnesses:
CHARLES C. STETSON,
WM. C. DEY.